SUBSCRIBER COMMUNICATION RECEIVER

Filed Feb. 11, 1963 7 Sheets-Sheet 1

INVENTOR.
George V. Morris
BY James E. Tracy
Atty.

INVENTOR.
George V. Morris
BY James E. Tracy
Atty.

SUBSCRIBER COMMUNICATION RECEIVER

Filed Feb. 11, 1963 7 Sheets-Sheet 3

INVENTOR.
George V. Morris
BY James E. Tracy
Atty.

SUBSCRIBER COMMUNICATION RECEIVER

Filed Feb. 11, 1963 7 Sheets-Sheet 4

INVENTOR.
George V. Morris
BY
James E. Tracy
Atty.

Jan. 11, 1966 G. V. MORRIS 3,229,302

SUBSCRIBER COMMUNICATION RECEIVER

Filed Feb. 11, 1963 7 Sheets-Sheet 5

INVENTOR.
George V. Morris
BY
James E. Tracy
Atty.

INVENTOR.
George V. Morris
BY James E. Tracy
Atty.

INVENTOR.
George V. Morris
BY James E. Tracy
Atty.

United States Patent Office 3,229,302

Patented Jan. 11, 1966

3,229,302
SUBSCRIBER COMMUNICATION RECEIVER

George V. Morris, Norridge, Ill., assignor to Zenith Radio Corporation, Chicago, Ill., a corporation of Delaware Filed Feb. 11, 1963, Ser. No. 257,562
11 Claims. (Cl. 346—37)

Figure 1:
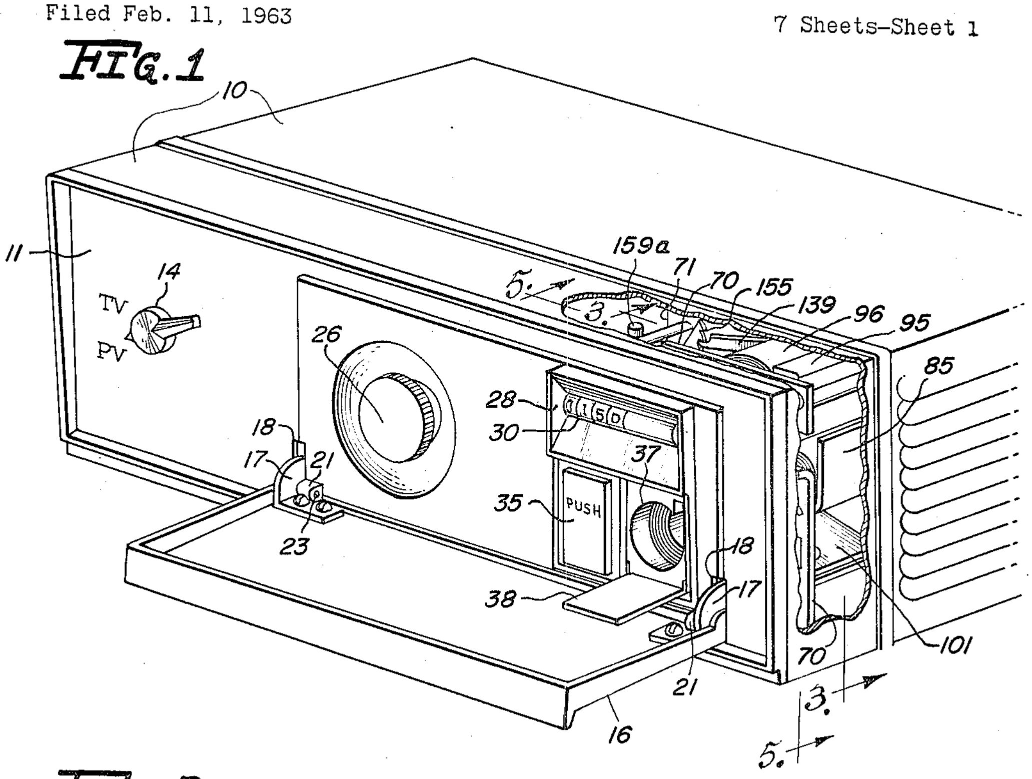

This invention relates to a subscriber communication receiver in which an adjustable apparatus must be given a predetermined adjustment before a received signal may be intelligibly reproduced. More particularly, it pertains to a charge recording arrangement for such a receiver. The invention is especially attractive when incorporated in an arrangement for receiving a television signal in coded form and will be described in such an environment.

A subscriber communication receiver of the above type, and also including a charge recording mechanism or register, is disclosed in copending application Serial No. 169,812, filed January 30, 1962, in the name of George V. Morris. In the system disclosed therein, an adjustable switching apparatus has a multiplicity of different conditions of adjustment or switch positions. The subscriber is obliged to establish the apparatus in a different predetermined condition of adjustment for each program. A correlation testing arrangement effectively examines the instantaneous adjustment of the apparatus and if it is appropriate for a given program, the signal for that program is intelligibly reproduced.

A charge register in the Morris application records a charge for each program which the subscriber views. Specifically, the charge register includes a printing mechanism having a roll of paper or billing tape on which charges are printed for the several subscription television programs viewed by the subscriber. A portion of the charge register is accessible to the subscriber at all times so that he may ascertain the charges recorded. More particularly, the charge register has a compartment, accessible to the subscriber, for receiving that part of the billing tape on which charges have already been recorded. The portion of the tape contained in the compartment may be severed and the separated tape may then be removed by the subscriber. It is contemplated in the copending application that the subscriber will be requested to pay the charges that have accumulated on his billing tape at periodic intervals, for example once every month. He accordingly would be instructed to remove the tape from the charge register compartment once a month and to forward the separated tape to the subscription service operator who tolls the charges and sends a bill in the amount of the total to the subscriber. Alternatively, the subscriber could compute his own bill and mail in a remittance along with the billing tape.

It is desirable that access to the charge register on the part of the subscriber be limited. Obviously, the subscription television operating company prefers that a single section of tape containing all of the printed charges for any given period, such as a month, be received for billing purposes. If the compartment containing the tape on which charges have already been recorded is accessible to the subscriber at all times, there is a possibility that the recorded tape section may be severed more frequently than once a month. This possibility is strengthened when the subscriber's equipment is subject to the normal curiosity of young children in the home where the equipment is installed.

In addition, before the tape is severed in the arrangement disclosed in the Morris application, a quantity of blank tape, considerably longer than the amount of tape required for each printed charge, is automatically drawn from the roll in order that all of the tape having charges printed thereon will be drawn past the cutter blade and into the compartment. Accordingly, unnecessary actuation of the knife blade by the subscriber results in an obvious waste of billing tape.

It is, therefore, an object of the present invention to limit the subscriber's access to the charge register, permitting access thereto only from time to time.

It is another object of the present invention to provide a new subscriber communication receiver.

A subscriber communication receiver, constructed in accordance with one aspect of the invention, for utilizing a received intelligence signal for each of several different programs, and wherein a charge may be assessed for each program, comprises an adjustable apparatus having a multiplicity of conditions of adjustment. The apparatus must be established by the subscriber in a different predetermined condition of adjustment for each program before the intelligence signal for that program may be intelligibly reproduced. There is a charge register, normally inaccessible to the subscriber, for recording a charge for each program to which the subscriber subscribes. Means are coupled between the apparatus and the charge register, and operable in response to the establishment of the apparatus in certain selected or key ones only of its conditions of adjustment, for rendering at least a portion of the register accessible in order that the charges recorded may be ascertained by the subscriber.

The features of this invention which are believed to be new are set forth with particularity in the appended claims. The invention, together with further objects and advantages thereof, may best be understood, however, by reference to the following description in conjunction with the accompanying drawings in which:

FIGURES 1–11*b* are various views of a subscriber communication receiver, specifically a subscription television receiver, constructed in accordance with one embodiment of the invention.

The arrangement of the present application is a modification of that shown in Morris application Serial No. 169,812. In fact, the transmitter and receiver circuitry for the system in the present application are identical to that shown in the earlier filed Morris case. Accordingly, reference is made to that copending application for details of the transmitter and receiver circuits. Very briefly, in the transmitter the television signal is coded by means of a coding signal having a rectangular wave shape, the instants at which the amplitude changes occur being determined in part by the particular adjustment of an adjustable switching apparatus at the time. Of course, a different adjustment will be required for each different subscription telecast. A corresponding switching apparatus is located at a subscriber receiver and if its setting agrees with that of the transmitter switching apparatus, a decoding signal is developed for achieving unscrambling which has a rectangular wave shape identical to that of the coding signal.

To make certain that the receiver switching apparatus is appropriately adjusted, the system of the Morris application employs a correlation testing concept wherein the correlation status is determined between the adjustment required of the switching apparatus for a given program and the instantaneous adjustment of that apparatus. This is achieved by comparing the waveshape of the decoding signal with a series of correlation pulses transmitted from the transmitter. If the receiver switching apparatus is properly set up, the timing of the correlation pulses will exhibit a predetermined relation with respect to the rectangular wave shape of the decoding signal, thereby providing an indication of correct correlation. When correct correlation has been achieved, the television signal is reproduced on the picture tube in the receiver. In addition, a print solenoid is actuated in a printing mechanism to effect printing on the billing tape of (1) a code number indicative of the particular program to which the subscriber subscribes and (2) the cost of that program.

Directing attention to FIGURE 1, all of the circuitry and equipment required for converting a conventional television receiver to a subscription television receiver is housed within a two-section metal cabinet 10 having a metallic front escutcheon 11. In other words, all of the equipment illustrated in the receiver circuit diagram in the copending Morris application, with the exception of those circuits contained in a conventional television receiver, is mounted within cabinet 10. Preferably, cabinet 10 is mounted on top of or in close proximity to the television receiver and a cable (not shown) provides the necessary circuit connections therebetween. Most of the electrical circuitry of the decoding equipment will be mounted within the rear section of cabinet 10, which is louvered for cooling purposes.

Figure 6B:
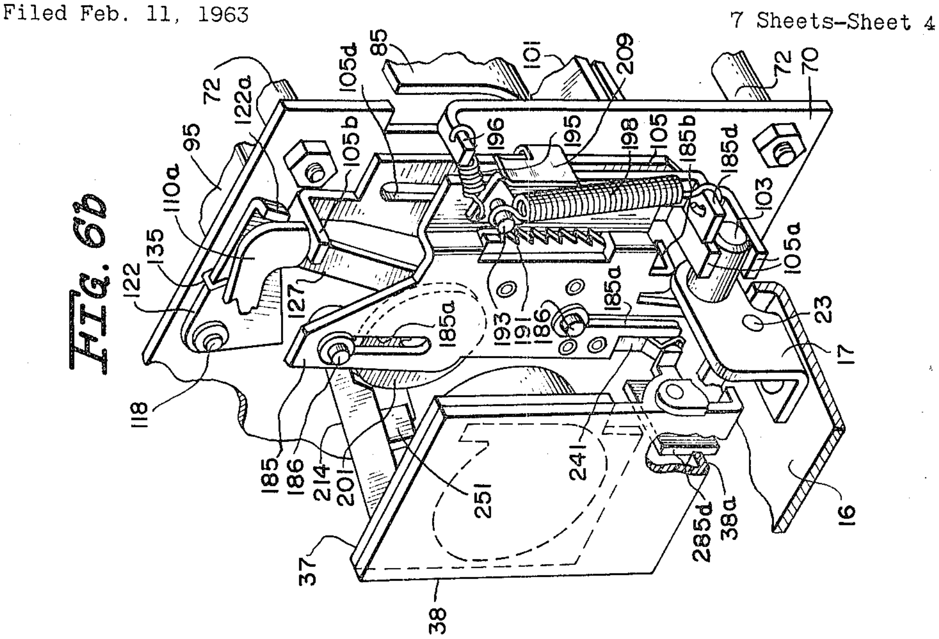
Figure 6A:
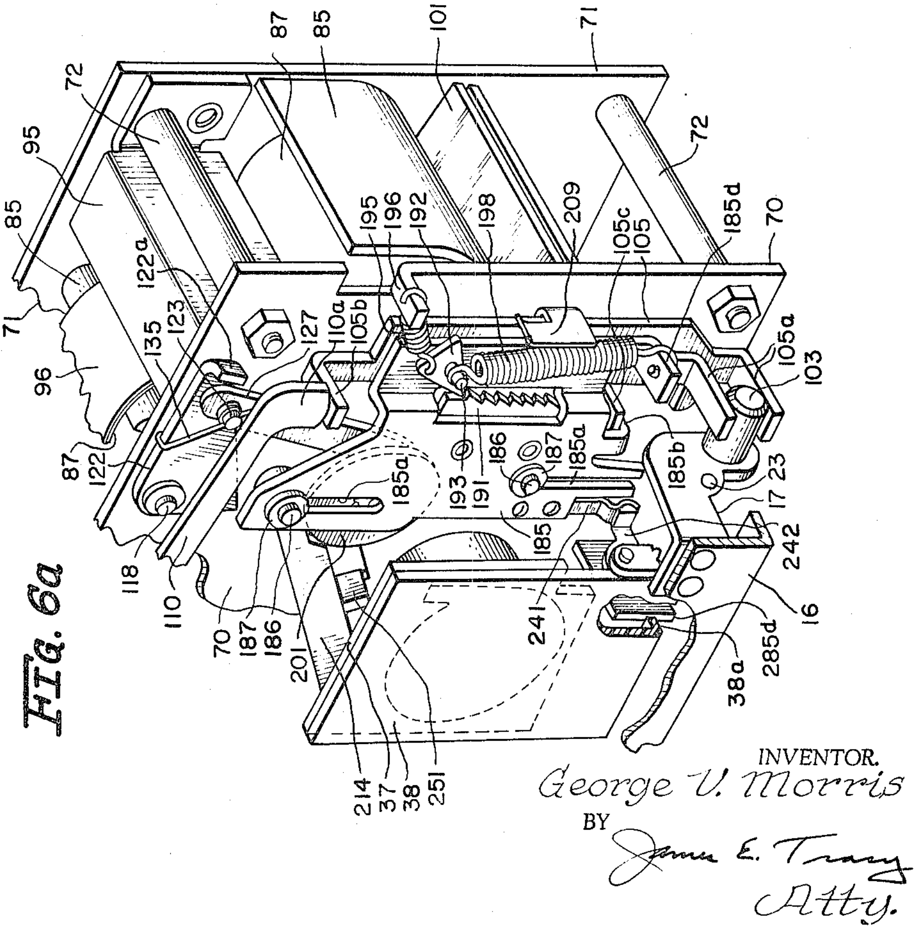
Figures 6C, 6D, 7, 8, 9:
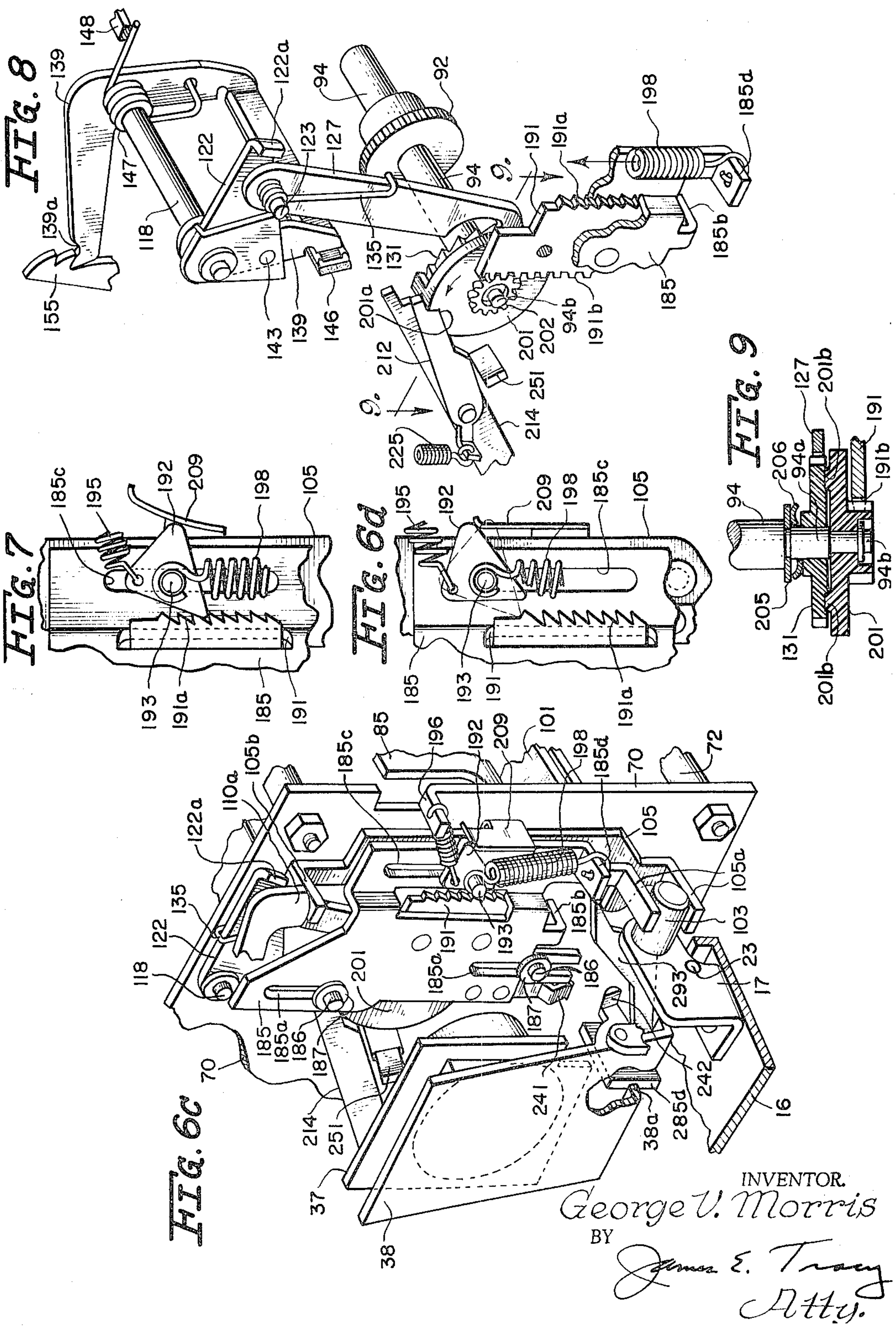

A control knob 14 positioned on the outside of front escutcheon 11 is connected to an operating shaft (not shown) which operates a PV-TV switch. Knob 14 is to be manipulated by the subscriber to the PV position for the reception of a subscription program and to TV when the decoding apparatus is to be effectively disassociated from the television receiver. A main door 16, to be actuated by the subscriber, is hinged to escutcheon 11 along the bottom thereof. Specifically, a pair of projections 17 are rigidly affixed to respective ones of the two bottom corners of door 16 and extend through apertures 18 of escutcheon 11. Portions 21 of front escutcheon 11 are provided with cylindrical channels for receiving a pair of pins 23, an end of each pin extending through and rigidly affixed in an aperture of a respective one of projections 17, as best seen in FIGURES 6*a*, 6*b* and 6*c*. In this way, pins 23 are journaled in the channels of portions 21. Door 16 may therefore be pivoted by the subscriber, with pins 23 as the fulcrum, between an open position as shown in FIGURE 1, and a closed position as seen in FIGURE 6*a*.

With door 16 opened, a manual control knob 26 is accessible to the subscriber. It is this knob that must be adjusted to set the code-determining switching apparatus to the appropriate condition of adjustment for any given program. Escutcheon 11 also contains a display window 28 in order that the instantaneous setting of a cyclometer register 30, located behind the window, may be read when door 16 is opened.

Cyclometer register 30 is of generally conventional construction and comprises the customary four wheels assigned, respectively, to units, tens, hundreds and thousands. The only difference in cyclometer 30 from one of entirely conventional construction is that the indicia on the units wheel are letters rather than numerals. Each of the tens, hundreds, and thousands wheels therefore contains ten digits ranging from zero to 9, while the units wheel comprises any ten letters selected from the alphabet. In the illustrated embodiment, it is contemplated that the indicia on the units wheel shall be letters A, B, C, D, E, F, G, H, J, and K. In setting up the code-determining switching apparatus for a given program, the subscriber rotates knob 26 in a clockwise or counterclockwise direction until a prescribed code combination of three digits and one letter appears in display window 28.

With door 16 in its open position, a push button 35, which extends through an aperture of front escutcheon 11, is available to the subscriber. A spring 36 shown in FIGURES 10*a* and 10*b*, biases push button 35 to a normal position flush against escutcheon 11. In a manner to be explained, if the adjustable switching apparatus is established in any one of certain selected key positions, push button 35 may be actuated by the subscriber to initiate the unlocking of a portion of the charge register so that access to that portion may be achieved.

Immediately adjacent push button 35 is a cylindrically shaped plastic compartment 37 which is covered by a door 38 hinged along its bottom to the front escutcheon. As will be described in detail later, door 38 is normally locked in its closed position so that access cannot be gained by the subscriber to the interior of compartment 37. Door 38 is unlocked, as will be described, in response to the actuation of push button 35 made possible only if the adjustable switching apparatus is established in certain selected or key ones of its conditions of adjustment; in other word, when cyclometer 30 displays any one of certain selected code numbers.

Figure 2:
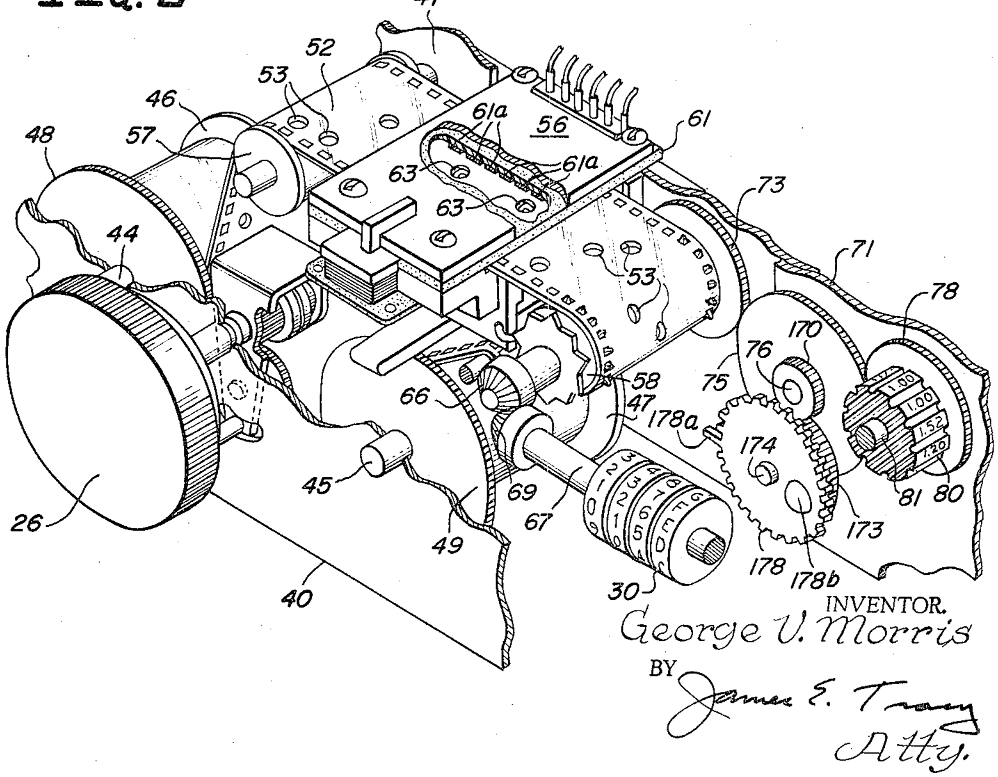

Referring now primarily to FIGURE 2 which illustrates the adjustable switching apparatus of the receiver, a front plate 40 and a back plate 41 are mounted in parallel spaced apart relationship with respect to each other and also with respect to front escutcheon 11 by means of appropriate rigid spacing and interconnecting structure, not shown. Apertures are provided in plates 40 and 41 to accommodate a pair of parallel spaced shafts 44, 45, on each of which is rotatably mounted a respective one of a pair of spools 46, 47. A drive gear 48 is rigidly affixed to spool 46 and is rotatably mounted on shaft 44. A companion drive gear 49, lying in the same plane as gear 48, is rigidly mounted to reel 47 and rotatably mounted on shaft 45. A perforated code tape or film 52, preferably made of polyester material such as Mylar, has one portion wound around spool 46 and another portion wound around reel 47. Tape 52 has a series of randomly positioned perforations 53. With the exception of holes 53, tape 52 is very similar to conventional 35 mm. camera film. Regularly spaced sprocket holes, occupying the standard sprocket hole pitch of $\frac{3}{16}$ inch for 35 mm. film, are disposed along both edges of tape 52.

The portion of tape 52, intervening spools 46 and 47, is guided through a matrix switch assembly 56 by means of a tape guide 57 and a sprocket 58, each of which has a shaft journaled in apertures of front and back plates 40, 41, respectively. The teeth of sprocket 58 extend into the sprocket holes of tape 52, causing rotation of the sprocket as tape 52 is transported. Matrix assembly 56 is rigidly connected to plate 41 and is positioned intermediate tape guide 57 and sprocket 58. Tape 52 is to be moved from one to another of a multiplicity distinct and spaced positions, and in each such position a different matrix or permutation pattern of holes 53 is presented to the matrix assembly.

Matrix assembly 56 is illustrated and described in complete detail in copending Morris application, Serial No. 169,812. Very briefly, the matrix includes a printed circuit panel 61, which lies immediately above tape 52, having a series of six parallel spaced, flat, conductive strips 61*a* printed thereon and in contact with tape 52. A series of spring contacts 63 are disposed immediately below tape 52 and certain of these contacts establish physical and electrical connections with certain of conductive strips 61*a* through the particular apertures 53 of the tape presented to the matrix at the time. As illustrated, only two of contacts 63 are visible through holes 53 of tape 52.

Conductive strips 61*a* are thus permutably connected to contacts 63 in accordance with the matrix pattern of perforations 53 of tape 52 presented to such contacts. As fully described in Morris application, Serial No. 169,812, the particular interconnection pattern established by switch matrix 56 determines in part the manner of operation of the decoding equipment in the receiver; specifically, it partially determines the wave shape of the decoding signal produced in the receiver.

In order to change the permutation pattern, which preferably is required before each new subscription television program, code tape 52 is moved to a different prescribed position, thereby to present a different pattern of apertures 53 to matrix switch assembly 56. Movement of the tape is accomplished by a driving mechanism actuated by the subscriber in response to rotation of knob 26. The driving mechanism selectively rotates either of spools 46, 47 to move the tape from one position to the next in a direction depending on whether knob 26 is rotated clockwise or counterclockwise. Very briefly, the driving means includes gearing which selectively engages either of gears 48, 49 for driving the spool to which the engaged gear is connected in order to move the tape. The driving arrangement is thoroughly illustrated and described in Morris case Serial No. 169,812 and reference is made thereto for details.

A mitre gear 66 is rigidly connected to the end of the shaft of sprocket 58 adjacent front plate 40 and the operating shaft 67 of cyclometer register 30 is also provided with a mitre gear 69 in mesh with gear 66. Thus, rotation of gear 66, in response to movement of perforated tape 52 in either direction, drives companion gear 69 to actuate the cyclometer register and display different indicia in window 28 for each different position of adjustment of the switching apparatus, each of which positions results from a different permutation pattern of perforations presented to switch matrix 56. Of course, when tape 52 is initially installed it is necessary that register 30 be appropriately positioned so that the number-letter combinations appearing in window 28 are matched with the permutation patterns in accordance with a master code at the transmitter. In this way, when a prescribed combination or code number appears in each subscriber's window 28, the same pattern of holes 53 is presented to contacts *61a*, 63 in each receiver.

Hence, the arrangement in FIGURE 2 constitutes an adjustable code-determining switching apparatus having a multiplicity of different conditions or positions of adjustment, and which must be established by the subscriber in a different predetermined condition of adjustment for each program before the signal for that program may be intelligibly reproduced. In other words, the permutation pattern established by switch matrix 56 at each subscriber's receiver must correspond to that set up in the transmitter in order that a decoding signal be produced which has a waveform identical to that of the code signal generated at the transmitter. Of course, proper adjustment of the switching apparatus of FIGURE 2 is achieved by the subscriber for any given program by rotating knob 26 until a prescribed code number-letter combination appears in window 28, this prescribed code number being disseminated to the subscriber prior to the commencement of the program in question.

Consideration will now be given to the charge register, which is normally inaccessible to the subscriber. The charge register is supported between a pair of parallel, spaced front and back plates 70, 71 interconnected by appropriate spacing elements 72, two of which are clearly seen in FIGURE *6a*. Plate 70 lies in the same plane as front plate 40 of the switching apparatus and back plate 71 lies in substantially the same plane as back plate 41 of the switching apparatus. Plates 40 and 70 are releasably connected together and plates 41 and 71 are similarly affixed by any appropriate means, such as screws. Sprocket 58 (FIGURE 2) carries at the end adjacent back plate 41 a gear 73 connected for rotation therewith. Another gear 75 is rotatably mounted on a stud 76 which in turn is fixedly secured to back plate 71. A gear 170 is secured to gear 75 and both are held in place on pin 76 with a C-shaped snap washer. Gears 73 and 75 mesh so that rotation of gear 73, which results from movement of tape 52, effects rotation of gears 75 and 170. A gear 78 is rigidly connected to a print wheel assembly 80 (only a portion of which is shown in FIGURE 2) and both are rotatably mounted on an axle 81 fixed to back plate 71. Gear 78 meshes with gear 75 in order that the rotation of sprocket 58 is transferred to print wheel assembly 80.

Assembly 80 is essentially a duplication of cyclometer register 30 and contains a series of four wheels that rotate in synchronism with respective ones of the four wheels of the cyclometer register. The print wheels are preferably constructed of nylon or delrin and contain indicia in the form of raised type which not only duplicates the indicia on the wheels of the cyclometer register but also displays the price associated with each cyclometer number-letter combination. The letter print wheel rotates in step with the letter wheel of cyclometer register 30 and carries the price designations. That portion of the letter print wheel which contains the raised type bearing the price information is shown in FIGURE 2.

Preferably, several different prices are employed; if desired, a different price may be associated with each of the ten letters of the letter wheel in cyclometer register 30. To permit distribution of free programs to the subscribers, one of the letters may be assigned to no-charge programs.

The position of the letter wheel of cyclometer register 30 therefore sets up the price for each program. In other words, if the letter G represents a subscription price of $1.50 and if the switching apparatus is so adjusted that G appears in window 28, the letter-price print wheel will have been rotated to present the letter G and the price of $1.50 to the position shown by type *80a* in FIGURE 3. In this position the letter G and price of $1.50 are immediately adjacent the billing tape in readiness for a printing operation to be described.

A billing tape container bracket 85 (see FIGURE 3) is positioned between plates 70 and 71, being affixed to back plate 71. Container bracket 85 holds a roll of blank paper billing tape 87 on which charge information is to be recorded. Preferably, the billing tape is semi-porous, similar to that used in an adding machine. The free end of paper tape 87 leads from the roll through a guide member 88 fixedly mounted between plates 70 and 71, past the line portion *80a* of the print wheel assembly 80, and then between engaging plastic backup and feed rollers 91, 92, respectively, the shafts 93, 94 of which are rotatably journaled in plates 70 and 71. The peripheral surfaces of rollers 91 and 92 are provided with a series of teeth or serrations so that counter-clockwise rotation of feed roller 92 (as viewed in FIGURE 3), initiated in a manner to be described, causes paper billing tape 87 to be drawn from its roll and down past line *80a* of raised type of print wheel assembly 80. Since backup roller 91 is so positioned with respect to roller 92 that the two normally engage, billing tape 87 is urged against feed roller 92.

A carbon paper container 95 is also rigidly connected between plates 70 and 71 and contains a quantity of relatively soft and dense carbon paper 96. The carbon paper leads from the roll to join the billing tape and is guided through the same path followed by paper tape 87. Carbon paper 96 and billing tape 87 constitute a two-layer lamination, with the carbon paper lying between the line *80a* of raised type of the print wheel assembly and the paper billing tape. Accordingly, pressure applied to the paper tape from the direction of arrow 98, effected in a manner to be explained, causes the line *80a* of raised type to print onto the paper billing tape.

Billing tape 87 and carbon paper 96, after being drawn past feed roller 92, are fed through a slot in a tape cutter assembly 101, rigidly mounted between plates 70 and 71, and then into an entrance slot *37a* of compartment 37. The compartment is preferably constructed of plastic and is rigidly mounted between plates 70 and 71. As mentioned previously, door 38 of compartment 37 is normally locked so that the subscriber cannot gain access to the tape in the compartment.

To explain the manner in which feed roller 92 is rotated counter-clockwise to achieve line-by-line feed of the billing tape, attention is directed to door 16. A stud 103 (see FIGURE *6b*) is rigidly connected to and extends outwardly from the right hand projection 17 of door 16.

The free end of stud 103 lies between a pair of projections 105*a* of a reset link 105 which is slidably mounted on the front of front plate 70. Such a mounting arrangement is facilitated by a stud 107 (see FIGURE 5), rigidly mounted to reset link 105, which rides in a guide slot 108 in plate 70. The free end of stud 107 is enlarged behind plate 70 to the extent that its diameter is larger than the width of slot 108. Link 105 is thereby captivated.

As door 16 is closed, stud 103 pivots around pin 23 in a clockwise direction, stopping in its lowermost position shown in FIGURE 6*a*. Projections 105*a* of reset link 105 are separated a distance only slightly greater than the diameter of stud 103 and therefore this movement of stud 103 effects downward sliding movement of link 105 to its lowermost position. On the other hand, when door 16 is opened to the position shown in FIGURE 6*b*, stud 103 moves to its uppermost position, causing link 105 to likewise move upwardly to its uppermost position.

A print wheel line-up bracket 110 (see FIGURE 5) is pivotally mounted to front plate 70 by means of a stud 111. An arm 110*a* of bracket 110 overlies a turned-out tab 105*b* of link 105. A wire spring 114 is looped around stud 111 and has its two ends anchored respectively in an aperture in plate 70 and a notch of bracket 110 to impart a counter-clockwise bias to the bracket. In this way, arm 110*a* is urged against tab 105*b*. Bracket 110 also has an arm 110*b* perpendicular to arm 110*a* and extending through a large notch 112 of plate 70 in a direction parallel to shaft 81 of print wheel assembly 80. Due to spring 114, arm 110*b* is normally urged against the print wheel assembly.

Figures 5, 5A, 5B, 5C:
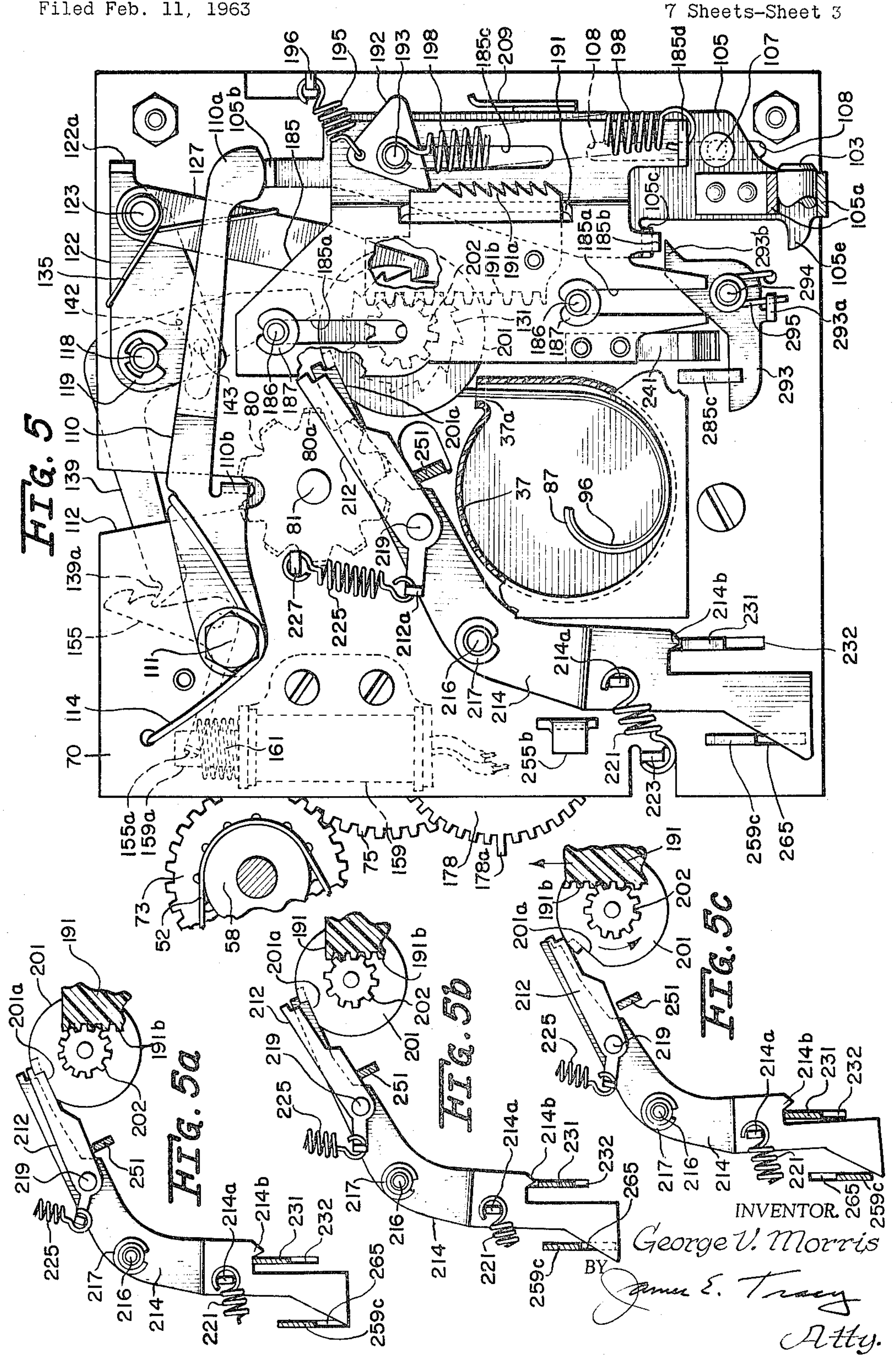

When door 16 is opened and reset link 105 is raised, tab 105*b* pivots arm 110*a* in a counter-clockerwise direction about stud 111 and arm 110*b* is moved out of engagement with the print wheel assembly. This permits the print wheel assembly to be rotated as explained previously by manipulation of knob 26. Subsequent to an adjustment of the switching apparatus for any given program, door 16 must be closed before the television signal may be intelligibly reproduced on the subscriber's picture tube, as fully described in the Morris application Serial No. 169,812. By closing the door reset link 105 is lowered and arm 110*b* returns into engagement with print wheel assembly 80 as shown in FIGURE 5. This lines up all four of the individual print wheels so that when a subsequent printing operation takes place, to be described, the printed characters will all be on the same line.

In order to effect feeding of paper tape 87 and carbon paper 96 to the print wheel assembly one line at a time and also to cock or reset the printing mechanism, a shaft 118 (see FIGURE 5) extends between and into respective apertures of plates 70 and 71. The shaft is captivated by a pair of E snap washers located respectively on the shaft in front of plate 70 and behind plate 71, one of which snap washers 119 is shown in FIGURE 5. A hammer reset lever 122 is pivotally mounted on shaft 118 immediately in front of front plate 70. A tape feed pawl 127 is pivotally mounted on a stud 123 fixed to the free end of lever 122. The free end of pawl 127 in turn engages a ratchet 131 which is fixedly mounted to shaft 94 of feed roller 92. In the illustrated embodiment, ratchet 131 is provided with a Double D shaped hole at its center and portion 94*a* of shaft 94 (see FIGURE 9) which accommodates ratchet 131 is given a corresponding Double D shaped configuration. In this way, ratchet 131 is permitted to move slightly along the axis of shaft 94, for reasons which will be explained, but any rotation of the ratchet is imparted to shaft 94.

A wire spring 135, looped several times around stud 123, has its two terminals hooked over hammer reset lever 122 and tape feed pawl 127 respectively. In this manner, lever 122 and pawl 127 are urged in a clockwise direction in order that the pawl may bear against the peripheral teeth of ratchet 131.

A print hammer bracket 139 is pivotally mounted on shaft 118 between plates 70 and 71. A curved slot 142 (see FIGURE 5) is provided in front plate 70 to accommodate a stud 143 rigidly connected to and extending between reset lever 122 and the portion of print hammer bracket 139 which is located immediately behind plate 70. By connecting lever 122 to bracket 139, movement of lever 122 is transferred to the bracket. A rubber-faced print hammer platen 146 (FIGURE 3) is mounted on bracket 139. A wire spring 147, coiled around shaft 118, has its two ends anchored respectively in bracket 139 and a tab 148 struck out of back plate 71. Spring 147 urges bracket 139 in a clockwise direction as viewed in FIGURE 3.

Figure 4:
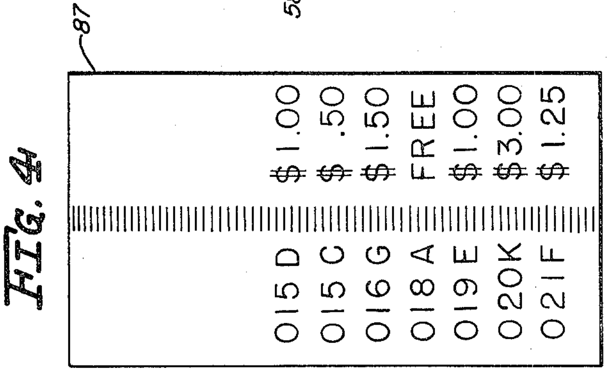

To raise pawl 127 and pivot bracket 139 in a counter-clockwise direction against the tension of spring 147, lever 122 is provided with a turned-out tab 122*a* which is engaged by tab 105*b* when reset link 105 is raised to its uppermost position which, as has been explained, occurs when door 16 is opened. This is best seen in FIGURES 6*b* and 6*c*. As door 16 is opened, tab 122*a* is raised by tab 105*b*, causing pawl 127 to likewise raise and in so doing rotate ratchet 131 one step in a counter-clockwise direction. Since ratchet 131 has twelve peripheral teeth, actuation of pawl 127 effects rotation of the ratchet through 30°. Rotation of ratchet 131 by that amount effects rotation of shaft 94 and consequently feed roller 92 to the extent that a quantity of paper tape 87 and carbon paper 96 are drawn from their respective rolls sufficient to print one complete line which is all that is needed to record all of the charge information for one program; the line contains a number-letter combination, which identifies the program, and also the price for that program. FIGURE 4 illustrates a section of billing tape 87 on which charge information has been printed for seven different programs.

The counter-clockwise pivoting of tab 122*a* about shaft 118 also causes print hammer bracket 139 to be rocked in a counter-clockwise direction against the tension of spring 147. Platen 146 therefore ends up in the cocked position shown in FIGURE 3.

Thus, opening of door 16 before the commencement of a given subscription television program causes, among other functions some of which are to be described while others are discussed in Morris application Serial No. 169,812, the feeding of one line portion of blank billing tape and carbon paper to print wheel assembly 80. Additionally, the print hammer is cocked since platen 146 is drawn away from the print wheel assembly against the tension of spring 147. Energy is thus stored in the spring for subsequent use in the printing operation.

Figure 3:
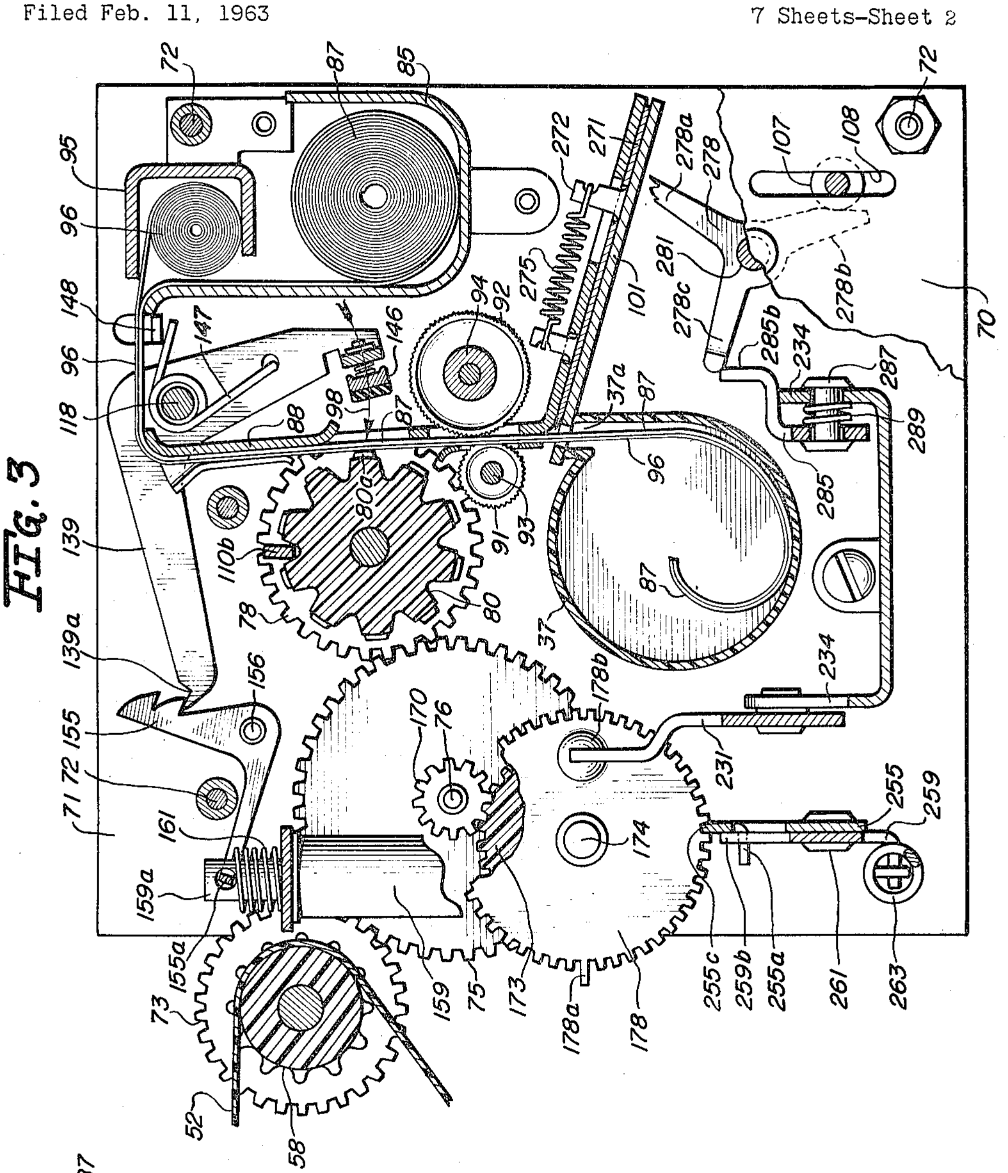

To retain print hammer platen 146 in its cocked position, shown in FIGURE 3, a hammer latch pawl 155 is pivotally mounted to back plate 71 by means of a stud 156. Latch 155 is provided with a pair of teeth either of which catches portion 139*a* of the bracket when the bracket is rocked in a counter-clockwise direction. As a consequence, print hammer platen 146 is retained in its cocked position by latch 155 when tab 105*b* is subsequently lowered as a result of the closing of door 16. In the reset position, pawl 127 is also held in its uppermost position so that subsequent openings and closings of door 16 will not result in feeding of paper billing tape to the print wheel assembly 80 and into compartment 37.

To release printing platen 146 from its cocked or reset position, a print solenoid 159 (see FIGURE 3) is mounted on the back of front plate 70. Plunger 159*a* of the print solenoid is provided with a channel for accommodating an arm 155*a* of latch 155. The arm extends substantially between and perpendicular to plates 70 and 71. A coil spring 161 is disposed on plunger 159*a* and is positioned between arm 155*a* and the coil portion of the solenoid. In this way, coil spring 161 urges arm 155*a* and plunger 159*a* in an upwardly direction, as viewed in FIGURE 3. Such action causes latch 155 to be urged in a clockwise direction around pin 156 to insure that the latch catches portion 139a of bracket 139 when the printing platen is cocked.

A corresponding print solenoid is included in the receiver circuit completely described in Morris application, Serial No. 169,812. As explained therein, the solenoid is energized subsequent to a series of correlation tests, occurring during a given subscription program, if it turns out that each of the tests indicates that the subscriber has correctly positioned his switching apparatus to the setting prescribed for that given program. Since the Morris receiver circuit is employed with the mechanical arrangement shown in the present application, print solenoid 159 energizes, subsequent to the correlation testing interval, only if the subscriber has correctly positioned the adjustable switching apparatus shown in FIGURE 2. When that does occur, plunger 159a is lowered into the solenoid, causing arm 155a and latch 155 to be pivoted counter-clockwise around pin 156 to release bracket 139. The energy stored in wound-up spring 147 is thereupon released, causing print hammer platen 146 to rapidly travel along the path indicated by arrow 98 (FIGURE 3) until it strikes the portion of paper billing tape and carbon paper immediately adjacent line 80a of raised type of print wheel assembly 80. This, of course, causes the raised type on line portion 80a to print on the billing tape. A charge is thus recorded for one particular program.

If desired, solenoid 159 may be de-energized immediately after it has effected release of bracket 139. This may be done, for example, by providing an off-on switch in series with the energizing circuit for the solenoid, which switch is closed by bracket 139 when the bracket is moved to its cocked position in FIGURE 3. Upon release from that position, in response to energization of the solenoid, the switch would then be opened by bracket 139 to open the energizing circuit for the solenoid.

For each subsequent program, the subscriber is also obliged to open door 16 and adjust knob 26 until a given letter-number combination appears in window 28. The print mechanism is therefore again cocked and another portion of blank billing tape is presented to line 80a of raised type, which line now contains the program identification and price for the new program. When door 16 is then closed and the correlation testing procedure completed, solenoid 159 energizes to effect another print operation.

The section of billing tape illustrated in FIGURE 4 is typical of that which is removed from the charge register in a manner to be explained. The tape section shows a series of printed charges alongside the program identifications. As previously noted, rotation of feed roller 92 for only 30° for each program moves a sufficient quantity of tape 87 past the raised type of print wheel assembly 80 that the charge entries may be printed on separate but closely spaced lines. Billing entries are printed upside-down so that when the billing tape is removed from the charge register the entries will appear in chronological order reading from top to bottom. In other words, the entry on the bottom line of the billing tape of FIGURE 4 represents the last subscription television program viewed before the tape was removed.

Consideration will now be given to the limited access feature to which the present application is addressed, namely the feature of permitting access to the contents of compartment 37 at certain times only. Of course, it must be possible for the subscriber to open door 38 of compartment 37 from time to time to ascertain from the section of billing tape in the compartment the total cost of the programs which the subscriber has viewed during a certain period.

Door 38 may be opened only when the adjustable switching apparatus of FIGURE 2 is established in any one of certain selected key conditions of adjustment. In other words, knob 26 must be manipulated by the subscriber until one of certain selected number-letter codes appears in window 28. At that time, door 38 may be unlocked by actuating push button 35.

To fully explain, small gear 170 (see FIGURE 3) meshes with a gear 173 journaled on a pin 174 rigidly mounted to a bracket (not shown) which is mounted to back plate 71. Rigidly connected to or made integral with gear 173 is a limited access wheel 178 which is also journaled on pin 174. A series of regularly spaced teeth of uniform height are disposed around the entire periphery of wheel 178, except for tooth 178a which has a height more than twice that of the others.

For reasons which will be explained, the ratio of gears 170 and 173 in conjunction with the ratio of gears 73 and 75 is arranged such that wheel 178 makes one complete revolution for the transport of so much of tape 52 as corresponds to 51 code numbers. In other words, if the code number displayed in window 28 with wheel 178 in the position shown in FIGURE 3 is 010C, in order to rotate wheel 178 one complete cycle knob 26 must be manipulated in either a clockwise or counter-clockwise direction through 51 conditions of adjustment until either code number 015D or 005B appears in window 28. Each of those number-letter code combinations is 51 code numbers away from 010C.

Whenever door 38 is unlocked, in a manner to be explained, and opened by the subscriber, it is automatically closed and locked the very next time door 16 is closed. Moreover, door 38 remains locked even though door 16 is subsequently re-opened. This is facilitated by a rack support bracket 185 (see FIGURES 5 and 6b) slidably mounted to front plate 70 in front of reset link 105 by a pair of studs 186 affixed to plate 70 and sliding in a pair of guide slots 185a of bracket 185. Captivation of the bracket is obtained by C-shaped snap washers mounted in grooves of studs 186 in front of bracket 185. With this arrangement, bracket 185 is supported to move slidably in a vertical direction. A tab 185b of bracket 185, turned toward plate 70, lies in the path of travel of a tab 105c of reset link 105, turned toward bracket 185. Accordingly, when door 16 is closed, and reset link 105 lowers to the position shown in FIGURE 5, tab 105c pushes bracket 185 downwardly.

A rapid tape advance rack 191, preferably constructed of plastic, is rigidly mounted, as by riveting, to support bracket 185. Rack 191 cooperates with a triangular-shaped ratchet pawl 192 to retain bracket 185 as it descends towards its lowermost position. Pawl 192 is pivotally mounted on a pin 193 fixedly mounted to plate 70. A slot 105d (see FIGURE 6b) is provided in reset link 105 and a slot 185c (see FIGURE 5) is provided in bracket 185 for accommodating pin 193, which protrudes therethrough. Pawl 192 is provided with a clockwise spring bias (as viewed in FIGURE 5) by means of a coil spring 195 connected to a corner of the pawl and to a tab 196 struck out of plate 70.

As bracket 185 moves downwardly with the closing of door 16, rack 191 moves down past pawl 192 due to the slope of its ratchet teeth 191a which then prevent upward movement of the bracket. If door 16 is only partially closed and then reopened, bracket 185 moves only partially toward its lowermost position and remains there due to pawl 192. FIGURE 7 illustrates the manner in which pawl 192 holds bracket 185 from rising. The reason for this feature will be explained later. Whenever door 16 is subsequently completely closed, as must be done before a subscription program is intelligibly reproduced, bracket 185 is lowered to its proper position and held there in a manner to be described.

A coil spring 198 connected between a tab 185d, turned out of bracket 185, and stud 193 urges bracket 185 upwardly and lowering of bracket 185, in response to closing of door 16, must be done against the tension of this spring. When the bracket is in its lowermost position, shown in FIGURE 5, coil spring 198 remains tensioned.

Lowering of bracket 185 resets or cocks a rapid tape feed disc 201, see FIGURE 5. Specifically, the disc is rotatably mounted on an extension 94*b* of shaft 94, best seen in FIGURE 9. A gear 202 is mounted to disc 201 and its teeth mesh with teeth 191*b* formed in rack 191 on the side opposite ratchet teeth 191*a*. Hence, as bracket 185 lowers, gear teeth 191*b* effect clockwise rotation of gear 202 about shaft 94 to drive disc 201 to the position shown in FIGURE 5. The surface of disc 201 facing ratchet wheel 131 has a series of teeth 201*b*, two of which are shown in the cross-sectional view of FIGURE 9, which mate with corresponding teeth of ratchet 131. However, the teeth on these surfaces are sloped such that clockwise rotation of disc 201 effects no rotation of ratchet 131. The mounting of ratchet wheel 131 on shaft extension 94*a* permits axial movement as required for the teeth of disc 201 to slip past. A C-shaped snap washer 205 on shaft 94 along with a spring 206 urge ratchet wheel 131 toward the face ratchet teeth 201*b* of disc 201. In this way, when disc 201 rotates counter-clockwise, there is concurrent rotation of ratchet 131 to effect counter-clockwise rotation of shaft 94 and feed roller 92.

Due to the ratchet shape of the face teeth on the surfaces of disc 201 and ratchet 131, counter-clockwise rotation of ratchet 131 (caused by pawl 127) effects no rotation of disc 201.

As mentioned previously, if bracket 185 is lowered only partially toward its lowermost position, it is retained there by pawl 192 and rack 191. They are not effective, however, in retaining bracket 185 in its lowermost position since every time door 16 is subsequently opened, pawl 192 is released from engagement with teeth 191*a*. Specifically, a flexible spring member 209 is affixed to reset link 105 in such position that it engages a corner of pawl 192 when the reset link is raised to its uppermost position shown in FIGURE 6*b* which occurs when door 16 is fully opened. Spring 209 rocks pawl 192 in a counter-clockwise direction (see FIGURE 6*d*), thereby releasing the pawl from rack 191. The reason for disconnecting the pawl and rack will be appreciated hereinafter.

Holding of bracket 185 in its lowermost position and rapid tape feed disc 201 in its reset position until access is to be gained to the contents of chamber 37 is effected by a release lever 214 and latch member 212, as best seen in FIGURE 5*a*. The release lever is pivotally mounted to a stud 216 mounted to front plate 70 and captivated by C-shaped snap washer 217. Latch 212 is pivotally mounted on a stud 219 affixed to release lever 214. A coil spring 221 connects a tab 214*a* of lever 214 to a struck-out tab 223 of front plate 70. In this way, lever 214 is provided with a clockwise bias as viewed in FIGURE 5. Another coil spring 225 connects a turned-out tab 212*a* of latch 212 to a tab 227 affixed to front plate 70. By that spring, latch 212 is normally urged in a clockwise direction. A locking lever 231, which projects through a slot 232 in front plate 70, normally retains release lever 214 in the position shown in FIGURE 5*a* against the force of spring 221. When disc 201 is reset, a cutaway notch 201*a* catches with latch 212. The latch is urged into the notch by spring 225. At the same time, notch 201*a* is urged against latch 212 by spring 198 which exerts a normal counter-clockwise torque on disc 201 through rack 191 and gear 202.

Figures 10A, 10B:
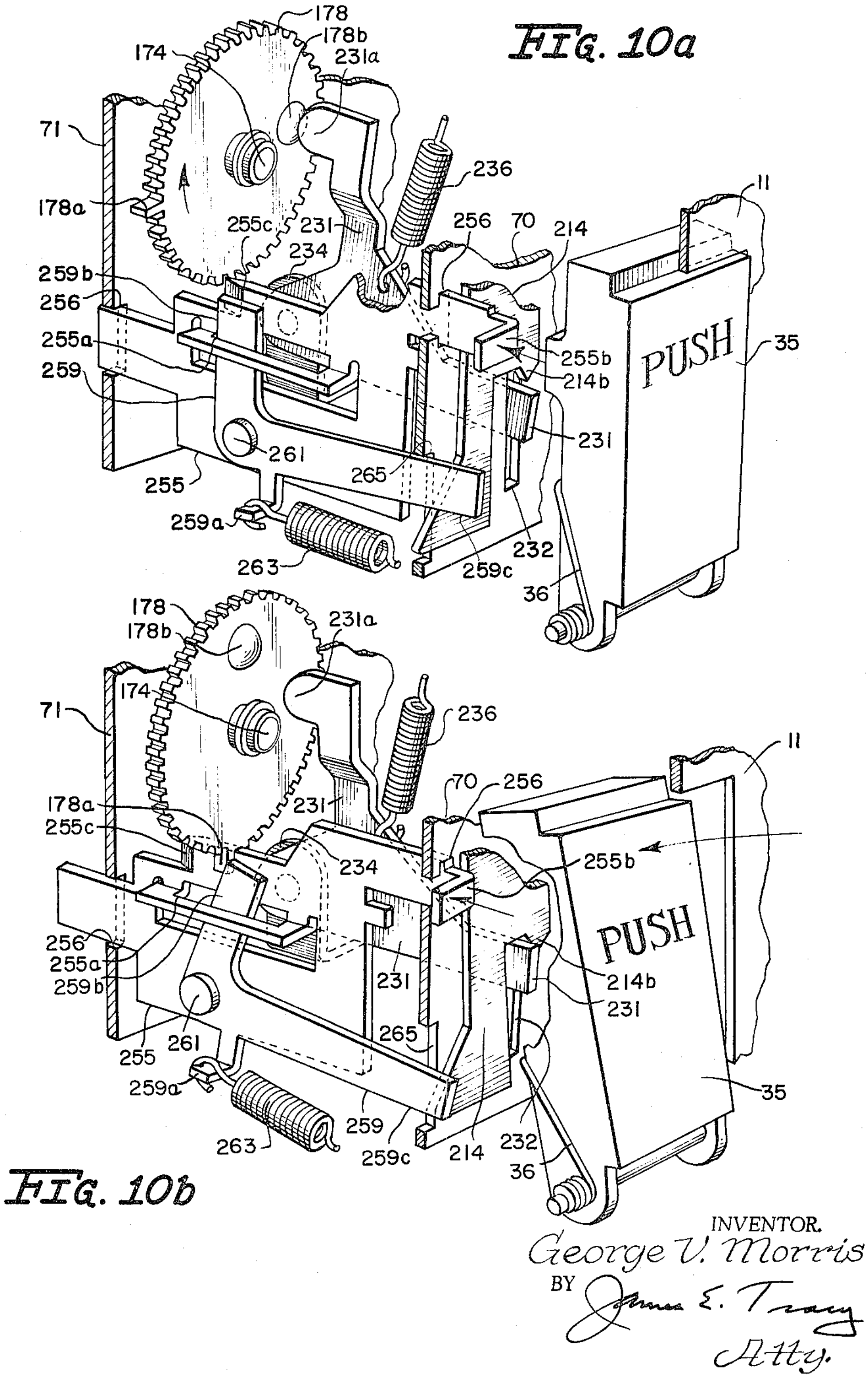

It will be noted in FIGURE 5*a* that lever 214 is out of engagement with notch 201*a*. This is caused by lever 231 which limits the extent to which lever 214 may be pivoted toward disc 201 when the disc is initially reset. As seen in FIGURES 10*a* and 10*b*, lever 231 is pivotally mounted to a bracket 234 which in turn is fixedly mounted to the front of back plate 71. A coil spring 236 connects lever 231 to a tab (not shown) on the back of front plate 70. The spring is so positioned that lever 231 is normally urged in a counter-clockwise direction, as viewed in FIGURES 10*a* and 10*b*, to engage lever 214 and retain it in the position shown in FIGURE 5*a*.

With bracket 185 in its lowermost position, and with disc 201 reset, access to the charge register is denied. This is achieved by means of door closing spring 241 rigidly affixed to the bottom of bracket 185, see FIGURES 5 and 6*a*. The spring is shaped to provide a notch which accommodates an arm 242, connected to door 38, when the door is closed as shown in FIGURES 6*a* and 6*b*. In that position, spring 241 very effectively locks the door closed.

Throughout the period in which the charge register is inaccessible, a charge is recorded for each program to which the subscriber subscribes. At the end of a relatively long period, such as at the end of each month, it is desirable that the recorded charges be ascertained in order that the subscriber may pay for the programs viewed. In accordance with the present invention, door 38 of compartment 37 is unlocked when the subscriber's adjustable switching apparatus of FIGURE 2 is positioned to any one of certain selected or key ones only of its various conditions of adjustment. At the end of each month the subscriber will be informed as to the key code number to which his adjustable apparatus must be positioned in order to gain access to his charge register. By withholding the key code number until just prior to billing time, the subscriber is prevented from prematurely removing the billing tape from his charge register.

Considering now the detailed manner in which unlocking of the charge register is facilitated, as mentioned previously limited access wheel 178 rotates one complete revolution for the transport of tape 52 and amount corresponding to every 51 code numbers. A dome-shaped cam portion 178*b* on the face of wheel 178 engages projection 231*a* of lever 231 when the wheel is rotated to occupy the position shown in FIGURES 3 and 10*a*. At that time, cam portion 178*b* rocks lever 231 in a clockwise direction, as viewed in FIGURE 10, lowering lever 231 away from lever 214. When that occurs, spring 221 effects clockwise rocking of lever 214 to the position shown in FIGURE 5*b* in which the end of lever 214 rests in notch 201*a* of disc 201. Concurrently pin 219, which is fixed to lever 214, moves in a clockwise direction, causing latch 212 to engage tab 251 which is struck out of front plate 70. Latch 212 is therefore rocked slightly in a counter-clockwise direction out of engagement with notch 201*a* of disc 201. However, while latch 212 is removed from disc 201, lever 214 continues its engagement with notch 201*a* and disc 201 is retained in its reset position. Cam portion 178*b* therefore effectively arms the release mechanism for disc 201. The reason for such arming will more fully be appreciated later.

When limited access wheel 178 is further rotated, to the extent that tooth 178*a* occupies the lowermost position of the wheel as shown in FIGURE 10*b*, the mechanism is now in condition for gaining access to the charge register. In other words, each code number that causes wheel 178 to occupy the position shown in FIGURE 10*b* is a key number and since the code-determining switching apparatus of FIGURE 2 must be actuated through 51 successive conditions of adjustment before tooth 178*a* again occupies the position of FIGURE 10*b* the key code numbers are necessarily 51 apart.

A limited access lever 255 (see FIGURES 3, 10*a* and 10*b*) is slidably mounted in a pair of slots 256 in front and back plates 70, 71, respectively. A release latch 259 is journaled and captivated on a stud 261 which in turn is rigidly mounted to lever 255. A coil spring 263 connects a turned-out tab 259*a* of release latch 259 to a tab (not shown) on the back of front plate 70. Spring 263 biases lever 255 toward front plate 70 while at the same time it exerts a normal counter-clockwise torque, as viewed in FIGURES 10*a* and 10*b*, on latch 259. Counter-clockwise movement of latch 259 is limited, however, by the presence of a slot 255*a* of lever 255 in which an arm 259*b* of the latch is retained.

Lever 255 is provided with a turned-out tab 255*b* in front of front plate 70 and which lies in the path of travel of push button 35. As shown in FIGURES 10*a* and 10*b*, a spring 36 normally biases push button 35 to a position flush with front escutcheon 11. When the button is depressed, however, tab 255*b* and consequently lever 255 are pushed toward back plate 71. If wheel 178 occupies any other position than that shown in FIGURE 10*b*, movement of lever 255 toward back plate 71 causes a portion 255*c* of the lever to move between adjacent teeth on the periphery of wheel 178. Since latch 259 is attached to lever 255, the latch also moves toward back plate 71. Unless wheel 178 occupies its position of FIGURE 10*b*, as latch 259 moves in a rearwardly direction arm 259*b* of the latch passes unobstructedly beneath the teeth of wheel 178.

At the position shown in FIGURE 10*b* which is the access position, rearward movement of lever 255 by the action of the subscriber pressing pushbutton 35 effects engagement of arm 259*b* with tooth 178*a*. Arm 259*b*, being blocked by tooth 178*a*, cannot continue its rearward movement along with lever 255. Consequently, release latch 259 pivots clockwise around stud 261 against the tension of spring 263. Arm 259*c* of the latch, which projects through a slot 265 of front plate 70, therefore lowers and engages lever 214. The configuration of lever 214 in the area of engagement is such that downward movement of arm 259*c* cams the lowermost portion of lever 214 to the right. In other words, lever 214 is rocked slightly in a counter-clockwise direction to the position shown in FIGURE 5*c*. Lever 214 therefore moves out of engagement with notch 201*a* of disc 201, freeing bracket 185 and rack 191 so that they can rise vertically under the tension of coil spring 198. It will be recalled, of course, that in order to actuate push button 35, the subscriber must initially open main door 16 which, among other things, releases ratchet pawl 192 from rack 191. Hence, at the instant lever 214 is pivoted out of engagement with notch 201*a*, rack 191 is no longer held in its reset position and is permitted to move rapidly upward.

Upward movement of rack 191 causes rapid counter-clockwise rotation of gear 202 and disc 201 as depicted by the arrow in FIGURE 5*c*. As mentioned hereinbefore, the teeth on the adjoining faces of disc 201 and ratchet 131 (see FIGURE 9) are shaped such that counter-clockwise rotation of disc 201 causes concurrent counter-clockwise rotation of ratchet 131. This in turn effects corresponding rotation of shaft 94 and feed roller 92. While actuation of ratchet 131 by means of pawl 127 rotates feed roller 92 to draw only so much of the billing tape and carbon paper as is necessary to print a charge for one program, counter-clockwise rotation of feed roller 92 resulting from counter-clockwise rotation of disc 201 draws a substantial quantity of billing tape 87 and carbon paper 96 from their respective rolls. This is necessary in order to draw all of the billing tape containing recorded charges past tape cutter assembly 101 and slot 37*a* and into compartment 37. In this way, when the tape cutter assembly is subsequently actuated, in a manner to be described, all of the charges printed theretofore, or at least since the last time access was gained to compartment 37, will now be in tape hopper 37.

The rapid upward movement of bracket 185 also unlocks door 38. As spring 241 rises along with bracket 185, arm 242 of door 38 is pivoted in a counter-clockwise direction, as viewed in FIGURE 6*a*, to the position shown in FIGURE 6*c*. The charge register is now in a condition such that the section of billing tape contained in compartment 37 may be separated from the remainder of the tape in the charge register.

Tape cutter assembly 101 contains a pair of parallel plates (FIGURE 3) between which is sandwiched a movable cutter blade or knife 271. A tab 272 is rigidly mounted to the top surface of knife blade 271 and protrudes through a slot 101*a* of the top plate of cutter assembly 101. A coil spring 275 connects tab 272 to a tab 101*b* which is struck out of the top plate of cutter assembly 101. In this way, spring 275 urges cutter blade 271 toward the billing tape and carbon paper. Knife blade 271 is cocked to a reset position by means of a cocking lever 278 which is actuated in response to closing of main door 16. Specifically, lever 278 is rotatably mounted on a stud 281 which is fixedly mounted to front plate 70. An arm 278*a* of the lever engages a tab extension 271*a* of the knife blade. Another arm 278*b* lies in the path of travel of stud 107 rigidly connected to reset link 105 and which protrudes through slot 108 of front plate 70 as explained previously. When reset link 105 is lowered, stud 107 engages arm 278*b* and pivots lever 278 in a clockwise direction as viewed in FIGURES 11*a* and 11*b*. Arm 278*a* therefore pushes tab 271*a* and consequently cutter blade 271 in a direction away from the billing tape and against the tension of spring 275.

Figure 11A:
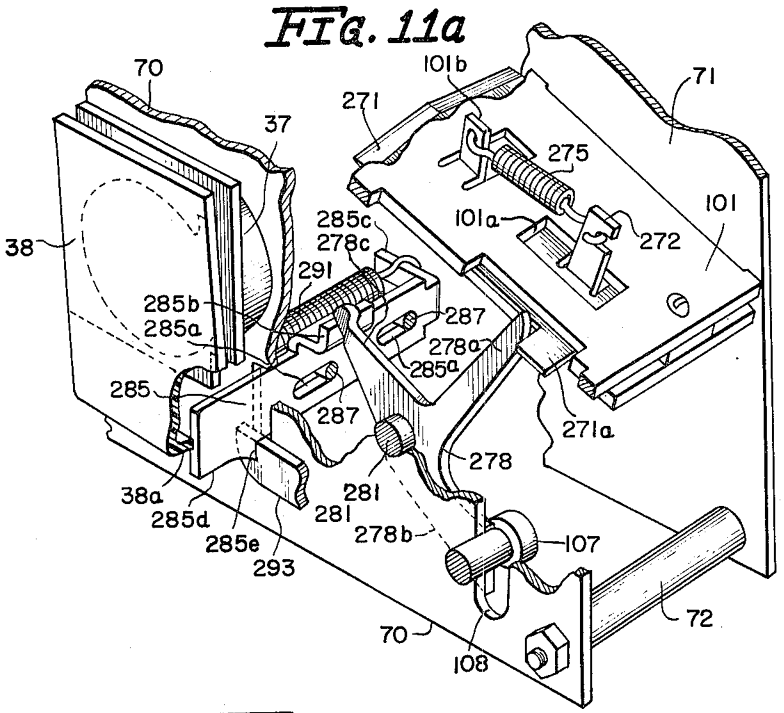
Figure 11B:
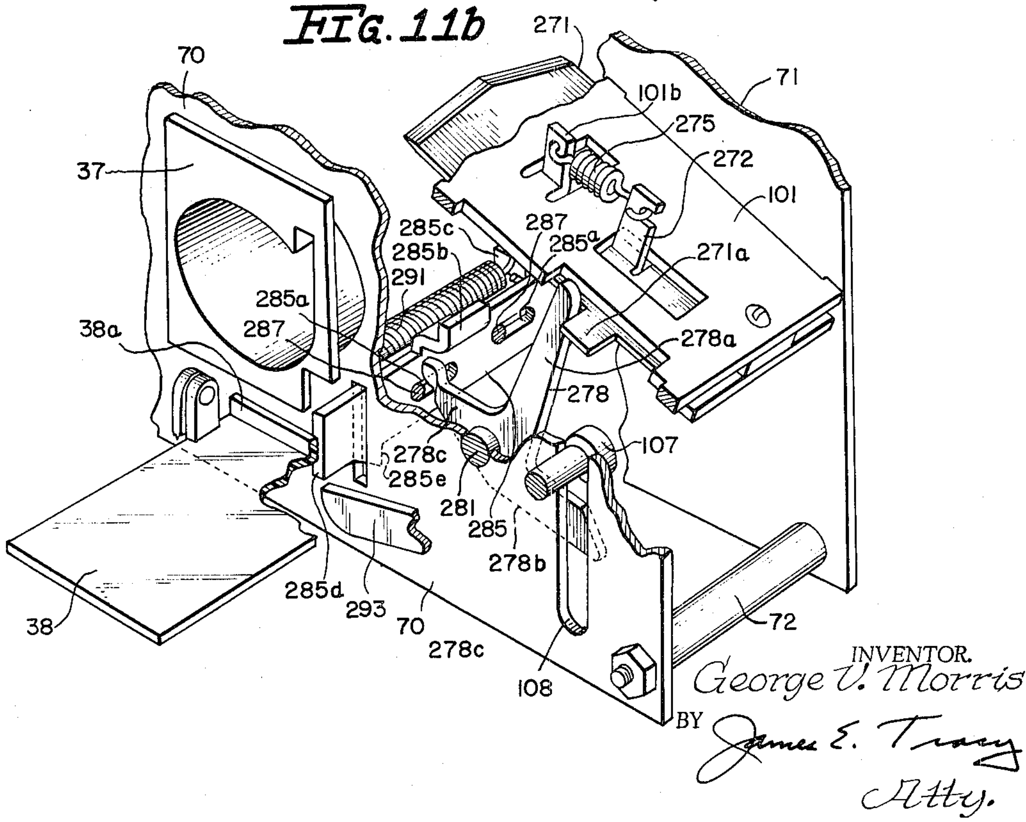

A cutter release arm 285 catches a third arm 278*c* of lever 278 when the lever is rocked to its most clockwise or reset position as shown in FIGURE 11*a*. Specifically, release arm 285 is slidably mounted to bracket 234, which is rigidly mounted between plates 70 and 71, by means of a pair of pins 287 which are connected to bracket 234 and ride in a pair of guide slots 285*b* of release arm 285. The free ends of pins 287 are appropriately capped, by C-shaped snap washers or the like, in order that arm 285 may be captivated in a slidable relation with respect to fixed bracket 234. A spring device 289 (one of which is shown in FIGURE 3) is mounted on each of studs 287 between arm 285 and bracket 234 in order to permit arm 285 to rock or pivot slightly. In this way, when door 16 is closed and stud 107 is lowered to cock lever 278 and cutter blade 271, the third arm 278*c* of the lever momentarily pivots release arm 285 in a counter-clockwise direction (as viewed in FIGURE 3), in order that arm 278*c* may move past portion 285*b* of arm 285 to assume the position shown in FIGURES 3 and 11*a*. In that position, lever 278 is prevented from pivoting in a counter-clockwise direction under the urging of spring 275 due to the holding action on arm 278*c* imparted by arm 285, as best seen in FIGURE 3. Hence, once cutter blade 271 is cocked by the initial closing of door 16, subsequent openings of the door, which of course effect upper movement of stud 107, will not release knife 271 from its reset position shown in FIGURE 11*a*. A coil spring 291, connected between a turned-out tab 285*c* of lever 285 and front plate 70, urges lever 285 toward the front plate.

The cutter blade may be released from its cocked position only after push button 35 has been depressed when the adjustable switching apparatus is established at one of the key code numbers. At that time, door 38 occupies the position shown in FIGURE 11*a*. Under those conditions, the subscriber will be instructed to grasp door 38 and pull it down to the position shown in FIGURE 11*b*. In that position, the lower portion 38*a* of door 38 engages portion 285*d* of cutter release arm 285 which protrudes through a slot of front plate 70.

Leaving door 38 for the moment, while door 16 is closed and reset link 105 is in its lowermost position a latch member 293 maintains arm 285 locked in the position shown in FIGURE 11*a*. Specifically, latch 293 is pivotally mounted on the front of front plate 70 (see FIGURE 5) by means of a stud 294, which is properly capped to maintain latch 293 captivated. A wire spring 295 looped around stud 294 has its free ends respectively anchored to a tab 293*a*, turned out of latch 293, and an aperture in front plate 70. By this arrangement, latch 293 is biased in a clockwise direction so that it bears into a notch 285*e* of arm 285. Hence, when door 16 is closed arm 285 is locked in the position shown in FIGURE 11*a* by the action of latch 293.

When door 16 is opened, portion 105*e* of reset link 105 (see FIGURE 5) engages arm 293*b* of latch 293 and rocks the latch in a counter-clockwise direction to the extent that it is pulled out of engagement with notch 285*e* of arm 285. As a consequence, when door 38 is pulled down by the subscriber, latch 293 is of no concern; before door 38 may be moved, main door 16 must have previously been opened by the subscriber which, of course, renders latch 293 incapable of locking arm 285. Latch 293 insures that the subscriber opens door 16 completely before door 38 is opened. Hence, in moving from the position shown in FIGURE 11*a* to that shown in FIGURE 11*b*, portion 38*a* of door 38 pushes arm 285 against the tension of spring 291. Arm 285 therefore moves toward back plate 271 to the extent that tab portion 285*b* moves out of engagement with arm 278*c* of lever 278. Since tab 285*b* no longer holds lever 278 in its cocked position, cutter blade 271, under the tension of spring 275, moves rapidly toward billing tape 87 and carbon paper 96 to sever that material. The cutting, of course, takes place slightly above entrance slot 37*a* of container 37, as best seen in FIGURE 3. Thus, the tape contained in compartment 37 is now separated from the remainder of the tape in the charge register and since door 38 is now fully opened to the position shown in FIGURE 11*b*, the subscriber may conveniently remove the section of tape from the compartment.

The subscriber will be instructed to ascertain the total cost of all of the individual programs which he has viewed by adding up the charges on the separated section of the billing tape. He may then mail in a remittance to the subscription service organization, pay the bill at a currency exchange, etc. Alternatively, he may merely forward the separated tape to the subscription service operator at which the charges may be totalled and a bill in the amount of the total mailed back to the subscriber. To identify the subscriber and to insure that all billing tape is returned, the paper tape stock may have printed on the reverse side two items: (1) a serial number repeated at closely spaced intervals and assigned to the particular decoding equipment in which the billing tape is installed; and (2) closely spaced numbers in a continuous series so chosen that in auditing returned tape the absence of a portion of the tape will easily be detected. In addition, it is contemplated that the billing tape will have printed thereon a colored stripe near the end as an indication that the decoder is almost out of tape.

Of course, after compartment 37 of the charge register is made accessible to the subscriber and main door 16 is subsequently closed, which must be done before the next subscription television program may be intelligibly reproduced, bracket 185 lowers to cock disc 201 and lever 278 pivots to cock cutter blade 271. Door 38 is again locked in its closed position and cannot be reopened until the adjustable apparatus of FIGURE 2 is positioned to one of the key numbers. As mentioned previously, it is contemplated that the subscriber will not be informed as to the identity of the next key number until a month later at billing time.

With disc 201 again in its cocked position latch 212 engages notch 201*a* as shown in FIGURE 5*a*. If the subscriber then attempts to gain access to compartment 37 by adjusting his equipment to the key code number that has already been used, he will be unsuccessful. This is due to the function of dome-shaped cam portion 178*b* of wheel 178 and locking lever 231 which arm the release mechanism for disc 201. When push button 35 is actuated with lever 214 and latch 212 in their positions shown in FIGURE 5*a*, nothing is accomplished even though the equipment is set up to the key number previously used and pivoting of release latch 259 is effected as shown in FIGURE 10*b*. This follows since lever 214, in its position shown in FIGURE 5*a*, lies outside of the path of travel of arm 259*c* of latch 259. In other words, as arm 259b lowers in slot 265 it does not engage lever 214 and thus it is impossible to release disc 201 from its reset or cocked position. Before disc 201 may be released, it is essential that its release mechanism be armed, namely that latch 212 be rocked out of notch 201*a* and, as explained previously, this can only be done by adjusting the code-determining switching apparatus of FIGURE 2 through each one of a sufficient number of positions to cause wheel 178 to rotate to the extent that dome-shaped cam portion 178*b* engages portion 231*a* of locking lever 231. Due to the spacing of cam portion 178*b* with respect to tooth 178*a*, the adjustable switching apparatus must be adjusted through approximately 38 different positions away from a given key position, when progressing through increasing code numbers, and through approximately 13 different positions away from the same key code number, when going through decreasing code number positions, before the apparatus may be returned to that key position in order to effect access to compartment 37. This follows since adjusting the switching apparatus in the direction of increasing code numbers effects counter-clockwise rotation of wheel 178. Hence, the wheel must be rotated counter-clockwise from the key position of FIGURE 10*b* approximately three-fourths of a complete revolution before cam portion 178*b* moves around to engage lever 231. Since progressing through 51 code numbers completes one revolution, 38 positions must be assumed to rotate wheel 178 three-fourths of a complete revolution. On the other hand, adjusting the switching apparatus in the direction of decreasing code numbers causes clockwise rotation of wheel 178 away from the position of FIGURE 10*b*. Approximately one-fourth of a revolution or 13 code numbers is necessary to move cam portion 178*b* to the position in which it actuates lever 231.

If the subscriber follows the instructions of the operating company and adjusts his switching apparatus to the prescribed key number at the conclusion of each month's operation, wheel 178 will have rotated the required angular distance in order to actuate locking lever 231 since the key number will be 51 or multiples of 51 from the key number required for the previous month.

Obviously, the system may be modified to space the key code numbers more or less than 51 apart. The spacing number should be large enough that access positions are so spaced as to make them infrequent, but small enough that re-arming will take place during a billing period. The number of codes between recurring access numbers should preferably not be divisible by 10 so that successive numbers will not fall on the same code letter as this would make the occurrence of numbers more obvious.

The reason for making element 209 of a flexible spring material, rather than of some inflexible rigid material, will now be explained with particular reference to FIGURE 7. As has been explained, each time bracket 185 rises, which normally occurs at the time access is gained to the charge register, relatively large amount of billing tape is drawn from its roll by feed roller 92. If the subscriber does not initially close door 16 completely, subsequent to gaining access to compartment 37, bracket 185 will not be lowered to the extend required to reset disc 201 to the position shown in FIGURE 5*a*. In the absence of pawl 192 and rack 191, bracket 185 will then rise to its uppermost position when main door 16 is again opened. Raising of bracket 185 will cause rotation of feed roller 92 and unnecessary billing tape would be fed into compartment 37. Pawl 192 insures that bracket 185 is retained at its depressed position assumed when door 16 is only partially closed. Before the next program may be intelligibly reproduced, it will be necessary for the subscriber to completely close door 16. At that time, bracket 185 will be lowered to its fully reset position shown in FIGURE 5. FIGURE 7 illustrates a typical position assumed by bracket 185 when door 16 has only been partially closed. In the position shown in FIGURE 7, pawl 192 is locked in to engagement with one of the teeth 191*a* of rack 191. By making element 209 flexible, that element, which of course moves upwardly with reset link 105 when door 16 is opened, flexes around a corner of pawl 192 as clearly seen in FIGURE 7.

In summary, the present invention provides a subscriber communication receiver for utilizing a received intelligence signal, namely a television signal, for each of several different programs, and wherein a charge may be assessed for each program. The receiver comprises an adjustable apparatus (most of the apparatus shown in FIGURE 2) having a multiplicity of different conditions of adjustment and which must be established by the subscriber in a different predetermined condition of adjustment for each program before the intelligence signal for that program may be intelligibly reproduced. The equipment primarily shown in FIGURES 3–11*b* constitutes a charge register, which is normally inaccessible to the subscriber, for recording a charge for each program to which the subscriber subscribes. The gearing arrangement comprising gears 75, 170 and 173, wheel 178, and all of the mechanism that operates in conjunction therewith, primarily provides means coupled between the adjustable apparatus of FIGURE 2 and the charge register, and operable in response to the establishment of the apparatus in certain selected ones of its conditions of adjustment (namely in each one of the key positions), for rendering at least a portion of the register (specifically compartment 37) accessible in order that the charges recorded may be ascertained by the subscriber.

While a particular embodiment of the invention has been shown and described, modifications may be made, and it is intended in the appended claims to cover all such modifications as may fall within the true spirit and scope of the invention.

I claim:

1. A subscriber communication receiver for utilizing a received intelligence signal for each of several different programs, and wherein a charge may be assessed for each program, comprising:

an adjustable apparatus having a multiplicity of different conditions of adjustment and which must be established by the subscriber in a different predetermined condition of adjustment for each program before the intelligence signal for that program may be intelligibly reproduced;

a charge register, normally inaccessible to the subscriber, for recording a charge for each program to which the subscriber subscribes;

and means coupled between said apparatus and said charge register, and operable in response to the establishment of said apparatus in certain selected ones only of its conditions of adjustment, for rendering at least a portion of said register accessible in order that the charges recorded may be ascertained by the subscriber.

2. A subscriber communication receiver for utilizing a received intelligence signal for each of several different programs, and wherein a charge may be assessed for each program, comprising:

an adjustable code-determining apparatus having a multiplicity of different conditions of adjustment and which must be established by the subscriber in a different predetermined condition of adjustment for each program before the intelligence signal for that program may be intelligibly reproduced;

a charge register for recording a charge for each program to which the subscriber subscribes;

locking means for preventing access to said charge register;

and means coupled between said code-determining apparatus and said charge register, and operable in response to the establishment of said code-determining apparatus in certain selected ones only of its conditions of adjustment, for actuating said locking means to render at least a portion of said register accessible in order that the total of the charges recorded during any given period may be ascertained by the subscriber.

3. A subscriber communication receiver for utilizing a received intelligence signal for each of several different programs, and wherein charges of different amounts may be assessed for different programs, comprising:

an adjustable apparatus having a multiplicity of different conditions of adjustment and which must be established by the subscriber in a different predetermined condition of adjustment for each program before the intelligence signal for that program may be intelligibly reproduced;

a charge register, normally inaccessible to the subscriber, for recording, for each program to which the subscriber subscribes, a charge in an amount selected from several different amounts;

and means coupled between said apparatus and said charge register, and operable in response to the establishment of said apparatus in certain selected ones only of its conditions of adjustment, for rendering at least a portion of said register accessible in order that the number and amount of the recorded charges may be ascertained by the subscriber.

4. A subscriber communication receiver for utilizing a received intelligence signal for each of several different programs, and wherein a charge may be assessed for each program, comprising:

an adjustable apparatus having a multiplicity of different conditions of adjustment and which must be established by the subscriber in a different predetermined condition of adjustment for each program before the intelligence signal for that program may be intelligibly reproduced;

a charge register, normally inaccessible to the subscriber, including a removable element on which a charge is recorded for each program to which the subscriber subscribes;

and means coupled between said apparatus and said charge register, and operable in response to the establishment of said apparatus in certain selected ones only of its conditions of adjustment, for rendering at least a portion of said register accessible in order that said element may be removed from said charge register and the charges recorded thereon ascertained by the subscriber.

5. A subscriber communication receiver for utilizing a received intelligence signal for each of several different programs, and wherein a charge may be assessed for each program, comprising:

an adjustable apparatus having a multiplicity of different conditions of adjustment and which must be established by the subscriber in a different predetermined condition of adjustment for each program before the intelligence signal for that program may be intelligibly reproduced;

a charge register, normally inaccessible to the subscriber, including an elongated and removable strip on which a charge is printed for each program to which the subscriber subscribes;

and means coupled between said apparatus and said charge register, and operable in response to the establishment of said apparatus in certain selected ones only of its conditions of adjustment, for rendering at least a portion of said register accessible in order that said strip may be removed from said charge register and the charges printed thereon ascertained by the subscriber.

6. A subscriber communication receiver for utilizing a received intelligence signal for each of several different programs, and wherein a charge may be assessed for each program, comprising:

an adjustable apparatus having a multiplicity of different conditions of adjustment and which must be established by the subscriber in a different predetermined condition of adjustment for each program before the intelligence signal for that program may be intelligibly reproduced;

a charge register, normally inaccessible to the subscriber, for recording a charge for each program to which the subscriber subscribes;

and means including a gearing arrangement coupled between said apparatus and said charge register for rendering at least a portion of said register accessible when said apparatus is established in certain selected ones only of its conditions of adjustment in order that the charges recorded may be ascertained by the subscriber.

7. A subscriber communication receiver for utilizing a received intelligence signal for each of several different programs, and wherein a charge may be assessed for each program, comprising:

an adjustment apparatus having a multiplicity of different conditions of adjustment and which must be established by the subscriber in a different predetermined condition of adjustment for each program before the intelligence signal for that program may be intelligibly reproduced;

a charge register, normally inaccessible to the subscriber, including a printing mechanism having billing tape on which a charge is printed for each program to which the subscriber subscribes;

and means coupled between said apparatus and said charge register, and operable in response to the establishment of said apparatus in certain selected ones only of its conditions of adjustment, for rendering at least a portion of said register accessible in order that said billing tape may be removed from said charge register and the charges printed thereon ascertained by the subscriber.

8. A subscriber communication receiver for utilizing a received intelligence signal for each of several different programs, and wherein a charge may be assessed for each program, comprising:

an adjustable apparatus having a multiplicity of different conditions of adjustment and which must be established by the subscriber in a different predetermined condition of adjustment for each program before the intelligence signal for that program may be intelligibly reproduced;

a charge register, including an elongated and removable strip on which charges are recorded for the different programs to which the subscriber subscribes, and a compartment, normally inaccessible to the subscriber, for receiving that part of said strip on which charges have been recorded;

and means coupled between said apparatus and said charge register, and operable in response to the establishment of said apparatus in certain selected ones only of its conditions of adjustment, for rendering said compartment accessible in order that said strip may be removed from said compartment and the charges recorded thereon ascertained by the subscriber.

9. A subscriber communication receiver for utilizing a received intelligence signal for each of several different programs, and wherein a charge may be assessed for each program, comprising:

an adjustable apparatus having a multiplicity of different conditions of adjustment and which must be established by the subscriber in a different predetermined condition of adjustment for each program before the intelligence signal for that program may be intelligibly reproduced;

a charge register, including a printing mechanism having a roll of billing tape on which charges are recorded for the different programs to which the subscriber subscribes, and a compartment, normally inaccessible to the subscriber, for receiving that part of said billing tape on which charges have been recorded;

means coupled between said apparatus and said charge register, and operable in response to the establishment of said apparatus in certain selected ones only of its conditions of adjustment, for rendering said compartment accessible to the subscriber;

and means operable by the subscriber for severing that part of said billing tape contained in said compartment from the remainder of said roll of billing tape in order that the separated tape may be removed from said compartment and the charges printed thereon ascertained by the subscriber.

10. A subscriber communication receiver for utilizing a received intelligence signal for each of several different programs, and wherein a charge may be assessed for each program, comprising:

an adjustable apparatus having a multiplicity of different conditions of adjustment and which must be established by the subscriber in a different predetermined condition of adjustment for each program before the intelligence signal for that program may be intelligibly reproduced;

a charge register, normally inaccessible to the subscriber, for recording a charge for each program to which the subscriber subscribes;

actuating means coupled between said apparatus and said charge register, and operable in response to the establishment of said apparatus in certain selected ones only of its conditions of adjustment, for rendering at least a portion of said register accessible in order that the charges recorded may be ascertained by the subscriber;

and means for preventing subsequent operation of said actuating means until said apparatus has been adjusted by the subscriber through each one of a given minimum number of conditions of adjustment.

11. A subscriber communication receiver for utilizing a received intelligence signal for each of several different programs, and wherein a charge may be assessed for each program, comprising:

an adjustable apparatus having a multiplicity of different conditions of adjustment and including means to be manipulated by the subscriber for changing said apparatus from one to the other of said conditions of adjustment in a given sequence, said apparatus to be established by the subscriber in a different predetermined condition for each program before the intelligence signal for that program may be intelligibly reproduced;

a charge register for recording a charge for each program to which the subscriber subscribes;

locking means for preventing access to said charge register;

actuating means coupled between said apparatus and said charge register, and operable in response to the establishment of said apparatus in certain selected ones only of its conditions of adjustment, for actuating said locking means to render at least a portion of said register accessible in order that the charges recorded may be ascertained by the subscriber;

and means operable responsive to the operation of said actuating means for preventing subsequent operation of said actuating means until said apparatus has been adjusted by the subscriber through each one of a given minimum number of conditions of adjustment.

No references cited.

LEYLAND M. MARTIN, *Primary Examiner.*